(12) United States Patent
Nishio

(10) Patent No.: US 11,318,794 B2
(45) Date of Patent: May 3, 2022

(54) PNEUMATIC TIRE

(71) Applicant: Toyo Tire Corporation, Itami (JP)

(72) Inventor: Taiichi Nishio, Itami (JP)

(73) Assignee: TOYO TIRE CORPORATION, Itami (JP)

(*) Notice: Subject to any disclaimer, the term of this patent is extended or adjusted under 35 U.S.C. 154(b) by 73 days.

(21) Appl. No.: 16/456,336

(22) Filed: Jun. 28, 2019

(65) Prior Publication Data

US 2020/0001653 A1 Jan. 2, 2020

(30) Foreign Application Priority Data

Jun. 29, 2018 (JP) .............................. JP2018-124938

(51) Int. Cl.
*B60C 11/03* (2006.01)
*B60C 11/12* (2006.01)
*B60C 11/11* (2006.01)

(52) U.S. Cl.
CPC ........ *B60C 11/032* (2013.01); *B60C 11/0306* (2013.01); *B60C 11/1204* (2013.01); *B60C 11/1236* (2013.01); *B60C 11/1259* (2013.01); *B60C 11/11* (2013.01); *B60C 2011/1209* (2013.01); *B60C 2011/1254* (2013.01)

(58) Field of Classification Search
CPC ... B60C 11/032; B60C 11/0306; B60C 11/11; B60C 11/1204; B60C 11/1218; B60C 11/1236; B60C 11/1259; B60C 11/1263; B60C 2011/1254; B60C 2011/1209; B60C 2011/1268
See application file for complete search history.

(56) References Cited

U.S. PATENT DOCUMENTS

2013/0105052 A1 5/2013 Tanaka

FOREIGN PATENT DOCUMENTS

| CN | 103072434 A | 5/2013 | |
|---|---|---|---|
| JP | 61-261109 A | 11/1986 | |
| JP | 11-301217 A | 11/1999 | |
| JP | 2006-341688 A | 12/2006 | |
| JP | 2010247707 A | * 11/2010 | ........... B60C 11/032 |
| JP | 2011148472 A | * 8/2011 | ............. B60C 11/12 |
| JP | 2015058912 A | * 3/2015 | ............. B60C 11/00 |

OTHER PUBLICATIONS

Office action dated Aug. 4, 2021, issued in counterpart CN Application No. 201910479483.0, with English translation. (16 pages).
Office Action dated Mar. 3, 2021, issued in counterpart CN application No. 201910479483.0, with English translation. (9 pages).

* cited by examiner

*Primary Examiner* — Steven D Maki
*Assistant Examiner* — Philip N Schwartz
(74) *Attorney, Agent, or Firm* — Westerman, Hattori, Daniels & Adrian, LLP

(57) ABSTRACT

A pneumatic tire in which a plurality of sipes 20 are formed in land sections of a tread and at least one of end parts in an extending direction of each sipe 20 is an end part 21 in the land section that is blocked in the land section, in which holes 22 separated from the sipes 20 are formed on line segments L connecting the end parts 21 in the land section of adjacent two sipes 20 to each other, and the hole 22 has a circular shape or an elliptical shape in plan view, a diameter of which becomes smaller as coming toward a deeper position.

10 Claims, 9 Drawing Sheets

PNEUMATIC TIRE

CROSS-REFERENCE TO RELATED APPLICATION

The present application claims priority from Japanese patent application No. 2018-124938 on the basis of Japanese patent application No. 2018-124938 (filing date: Jun. 29, 2018). The entire contents of Japanese patent application No. 2018-124938 is hereby incorporated into the present application by reference of Japanese patent application No. 2018-124938.

TECHNICAL FIELD

The present invention relates to a pneumatic tire.

BACKGROUND ART

In order to improve braking and driving performance and for other purposes, ripen are formed on land sections of a tread in a pneumatic tire in related art. However, stress is concentrated on end parts in an extending direction of sipes, therefore, cracks tend to occur from the end parts as starting points.

In response to the above, circular holes with a larger diameter (not a radiu) than a sipe width in plan view are formed at end parts in the extending direction of the sipes in related art (for example, refer to Patent Literature 1 and Patent Literature 2). These holes are cylindrical holes in which the diameter does not change toward a depth direction. As such holes disperse the stress applied to end parts in the extending direction of the sipes, they are effective for preventing occurrence of cracks.

Sipes having an annular shape at end parts in the extending direction are also proposed in Patent Literature 3.
  Patent Literature 1: JP-A-11-301217
  Patent Literature 2: JP-A-61-261109
  Patent Literature 3: JP-A-2006-341688

SUMMARY OF INVENTION

However, as a result that the cylindrical holes are formed at end parts in the extending direction of sipes, there is a problem that rigidity of the land section in the tread is reduced. The reduction in rigidity of the land section in the tread causes deterioration such as wear in the land section. In view of the above, an object of the present invention is to provide a pneumatic tire in which cracks starting from end parts in the extending direction of sipes hardly occur and rigidity of the land section in the tread is not reduced too much.

In an pneumatic tire according to the embodiment in which a plurality of sipes are formed in land sections of a tread and at least one of end parts in an extending direction of each sipe is an end part in the land section that is blocked in the land section, holes separated from the sipes are formed on line segments connecting the end parts in the land section of adjacent two sipes to each other, and the hole has a circular shape or an elliptical shape in plan view, a diameter of which becomes smaller as coming toward a deeper position.

In the pneumatic tire according to the embodiment, cracks starting from the end parts in the extending direction of the sipes hardly occur due to the existence of holes. Additionally, the diameter of the holes is smaller as coming toward the deeper position, therefore, the rigidity of the land sections in the tread is not reduced too much.

MODE FOR CARRYING OUT THE INVENTION

A structure of a pneumatic tire according to an embodiment will be explained with reference to the drawings. A brand-new unworn pneumatic tire will be explained below unless otherwise particularly mentioned. A heavy load tire fitted to a truck or a bus is assumed to be used as an example of the pneumatic tire according to the embodiment. A studless tire fitted at the time of traveling on an icy road is also assumed to be used as an example of the pneumatic tire according to the embodiment.

A general cross-sectional structure of the pneumatic tire according to the embodiment is as follows. First, bead sections are provided on both sides in a tire width direction and carcass plies are folded from an inner side to an outer side in the tire width direction to wrap the bead sections and form a skeleton of the pneumatic tire. A plurality of belts are provided on an outer side in a tire radial direction of the carcass plies, and a tread having a ground contact surface on an outer side in the tire radial direction of the belts is provided. Sidewalls are provided on both sides in the tire width direction of the carcass plies. A plurality of members necessary for functions of tires are provided in addition to the above members.

Figure 1:
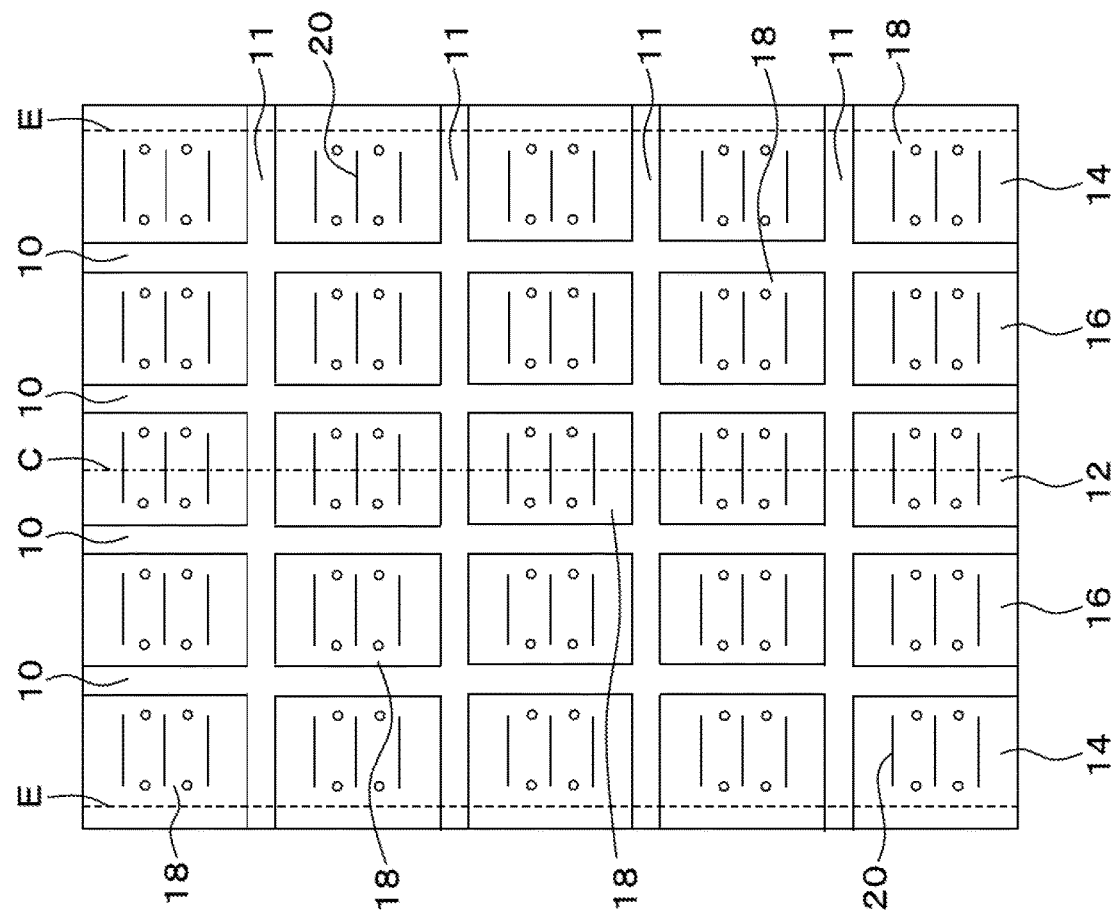
FIG. 1 shows a tread pattern according to an embodiment.

A tread pattern as shown in FIG. 1 is formed on the tread. In the illustrated tread pattern, four main grooves 10 extending in a tire circumference direction are formed. Although a depth of the main grooves 10 is not limited, the depth is, for example, 17 mm or more to 22 mm or less. Then, as regions demarcated by the main grooves 10, a center region 12 through which a center line C in the tire width direction passes, shoulder regions 14 between tire ground contact ends E as both end parts in the tire width direction on the ground contact surface of the tread and the main grooves 10 and mediate regions 10 between the center region 12 and the shoulder regions 14 are formed.

Moreover, in the center region 12, the shoulder regions 14 and the mediate regions 16, blocks 10 as land sections demarcated by a plurality of lateral grooves 11 extending in the wire width direction are arranged side by side in a tire circumferential direction.

However, the tread pattern is just an example. The number of main grooves, the existence of lateral grooves, inclinations of respective grooves with respect to the tire circumferential direction and the tire width direction and the like are not limited to the state shown in FIG. 1. The land sections in respective regions may be ribs extending in the tire circumferential direction without being divided by the lateral grooves, however, the case where the land sections in respective regions are the blocks 18 will be explained below.

Figure 2:
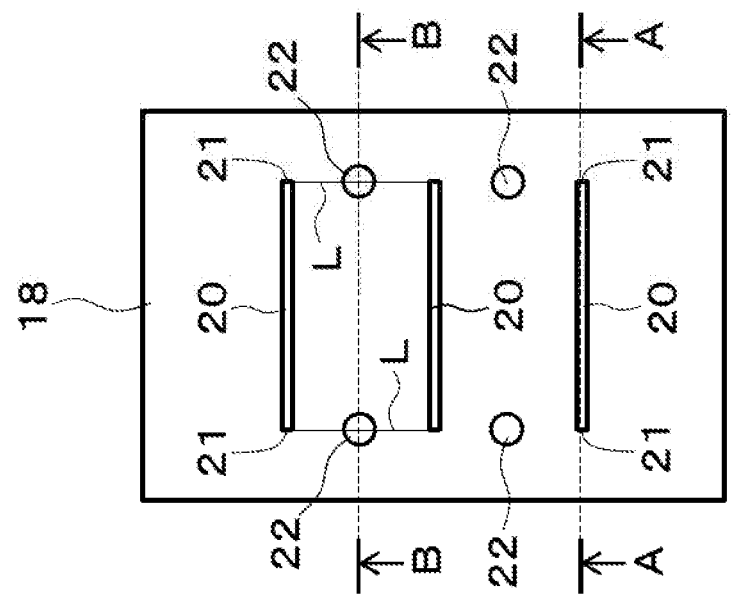
FIG. 2 is a plan view showing a block according to the embodiment.
Figure 3:
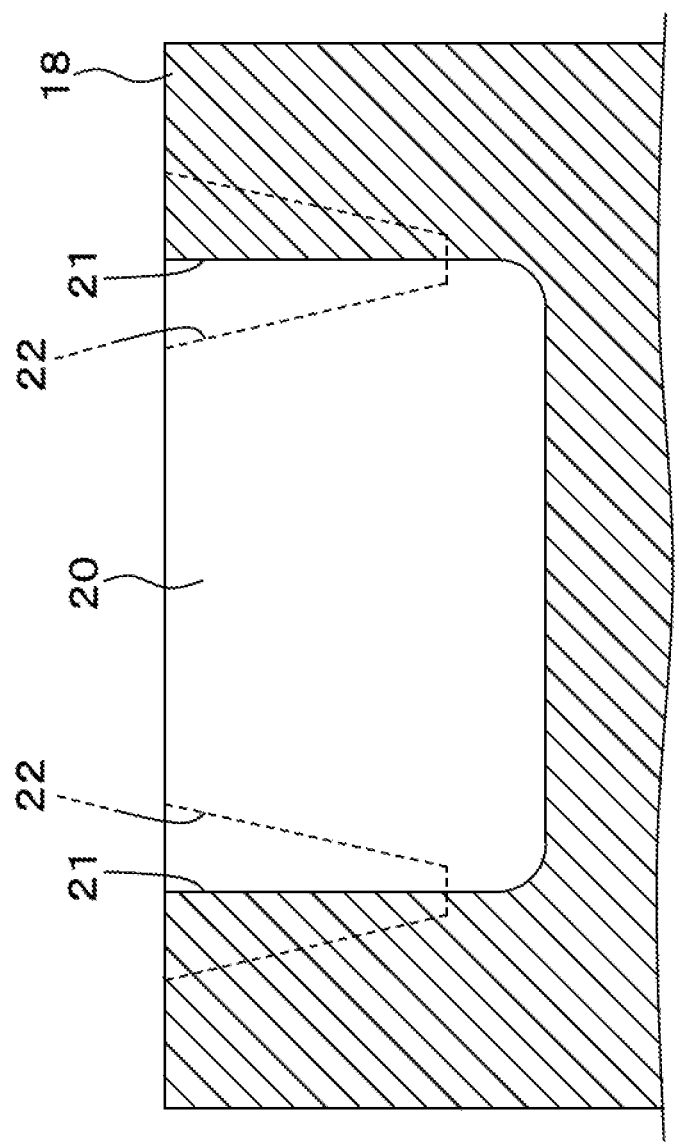
FIG. 3 is a cross-sectional view (cross-sectional view in A-A position of FIG. 2) of a sipe in a depth direction according to the embodiment.

As shown in FIG. 1 to FIG. 3, plural sipes 20 respectively extending in the tire width direction are formed in these blocks 18. In the present invention, the sipe 20 indicates a groove with a narrow width. More precisely, the sipe is the groove in which an opening to the ground contact surface is closed under a condition that the pneumatic tire fitted to a normal rim and filled with a normal internal pressure is made to contact on the ground and a normal load is added thereto.

Here, the normal rim is a "standard rim" in JATMA standard, "Design Rim" in TRA standard or "Measuring Rim" in ETRTO standard. The normal internal pressure is "the maximum air pressure" in JATMA standard, the maximum value of "TIRE LOAD LIMITS AT VARIOUS COLD INFLATION PRESSURES" in TPA standard, or "INFLATION PRESSURE" in ETRTO standard. The normal load is "the maximum load ability" in JATMA standard, the maximum value of "TIRE LOAD LIMITS AT VARIOUS COLD INFLATION PRESSURES" in TRA standard or "LOAD CAPACITY" in ETRTO standard.

The sipes 20 are drawn to have a straight line shape in plan view (namely, when the tread is seen from an outer side in the tire radial direction from a direction vertical to the ground contact surface) in FIG. 1 and FIG. 2, however, the sipes 20 may have a wave shape or a zigzag shape. Although the sipes 20 extend in the tire width direction in FIG. 1 and FIG. 2, the sipes 20 may also extend so as to be inclined with respect to the tire width direction in plan view and may also extend in the tire circumferential direction. In each block 18, these plural sipes 20 may extend in parallel to each other in plan view as shown in FIG. 1 and FIG. 2. A cross-sectional shape in a depth direction of the sipes 20 is an approximately rectangular shape in FIG. 3, however, the cross-sectional shape may also be a trapezoidal shape or the like.

Specific numerical values in length, width and depth of the sipe 20 are not limited. As examples, the width of the sipe 20 is 0.3 mm or more to 0.8 mm or less, and the depth of the sipe 20 is 50% or more to 70% or less of the depth of the main groove 10.

In the embodiment, both ends in the extending direction of the sipe 20 are end parts 21 in the land section that are blocked inside the block 18. However, it is also preferable that only one end part in the extending direction of the sipe 20 is the end part 21 in the land section and the other end part opens to the main groove 10 or the like from a block end.

Then, holes 22 separated from the sipes 20 are formed on line segments L connecting the end parts 21 in the land section of adjacent two sipes 20 to each other as shown in FIG. 2. The line segment L connects the end parts 21 in the land section on one side in the extending direction of the sipes 20 to each other. For example, in FIG. 2, the line segment L connects the end parts 21 in the land section on the left side of the sipes 20 as well as the line segment L connects the end parts 21 in the land section on the right side of the sipes 20 to each other.

A position of the hole 22 is preferably a position where a length of the line segment L is equally divided. For example, when one hole 22 is formed on the line segment L as shown in FIG. 2, the position of the hole 22 is preferably the position where the line segment L is equally divided into two, namely, the central position of the line segment L. In this case, a diameter of the hole 22 at an opening end 23 with respect to the ground contact surface (when the "ground contact surface" is merely used in the following explanation, it means the ground contact surface in a brand-new unworn pneumatic tire) is preferably 15% or more to 30% or less of the length of the line segment. L.

Also in a case where plural holes 22 are formed on the line segment L, positions of the holes 22 are preferably positions where the line segment L is equally divided. For example, when two holes 22 are formed on the line segment L, positions of the holes are preferably positions where the line segment L is equally divided into three. When two or more holes are formed on the line segment L, it is preferable that the sum total of diameters of all holes 22 is 15% or more to 30% or less of the length of the line segment L.

It is also preferable that a distance between the end part 21 in the land section and the center of the hole 22 on the line segment L extended from the end part 21 in the land section is 20% or more to 40% or less of the depth of the sipe 20.

Although the state in which the center of the hole 22 is positioned on the line segment L is shown in FIG. 2 as a preferable example, the center of the hole 22 can be shifted from the line segment L in plan view as far as any part of the hole 22 is positioned on the line segment L in plan view.

Figure 4:
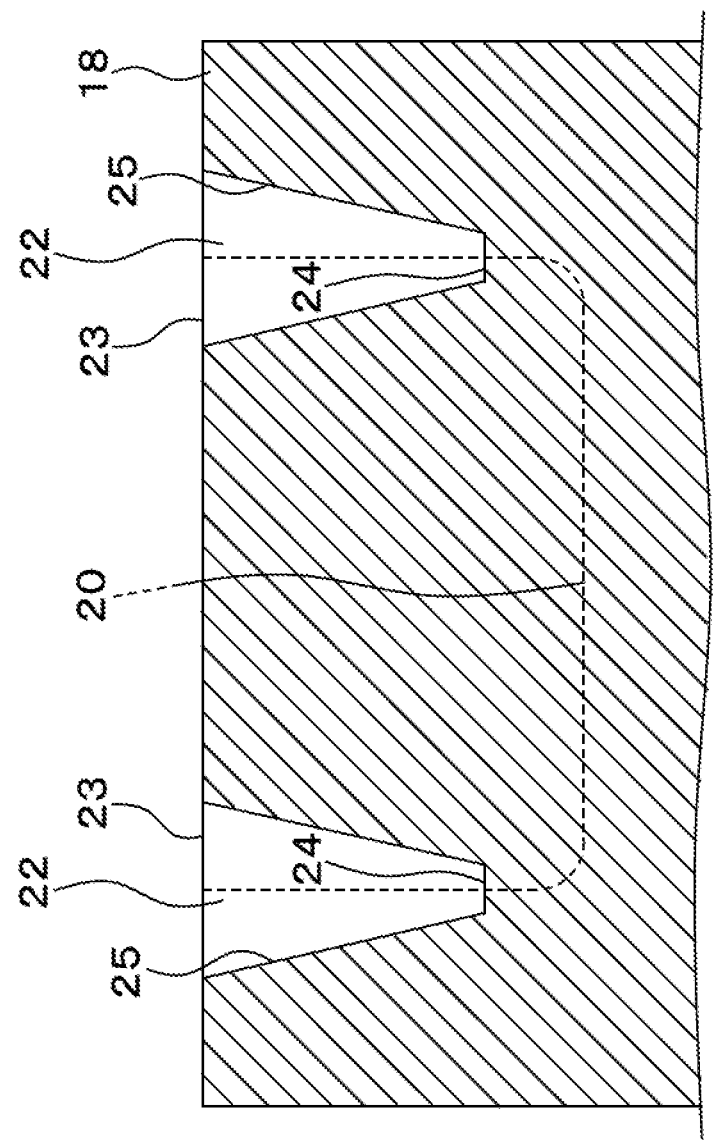
FIG. 4 is a cross-sectional view (cross-sectional view in B-B position of FIG. 2) of holes in a depth direction according to the embodiment.

The hole 22 is deepened from the opening end 23 with respect to the ground contact surface toward an inner side in the tire radial direction as shown in FIG. 4. The diameter of the hole 22 is gradually reduced toward the depth direction. That is, the diameter of the hole 22 (when the hole has the circular shape as shown in FIG. 2, the diameter does not mean a radius) becomes smaller toward a deeper position. In the embodiment, the diameter of the hole 22 continuously becomes smaller as coming close to the bottom part 24. It is preferable that the bottom part 24 of the hole 22 is a flat surface. A depth of the hole 22 is preferably 50% or more to 100% or less of the depth of the sipe 20.

In FIG. 2, the holes 22 are formed on the line segments L connecting the end parts 21 in the land section of adjacent two sipes 20 to each other on both sides in the extending direction of the sipes 20. However, when both ends in the extending direction of the sipes 20 are the end parts 21 in the land section, the hole 20 may be formed on the line segment L connecting the end parts 21 in the land section of the adjacent two sides 20 to each other only on one side in the extending direction of the sipes 20. Moreover, the depth and the diameter of the holes 22 are the same on both sides in the extending direction of the sipes 20 in FIG. 2 and FIG. A. However, at least one of the depth and the diameter of the holes 22 may differ on both sides in the extending direction of the sipes 20.

As described above, the holes 22 separated from the sipes 20 are formed on the line segments L connecting the end parts 21 in the land section of adjacent two sipes 20 to each other in the embodiment. Then, the holes 22 are deformed when the block 18 is deformed, thereby avoiding concentration of stress on the end parts 21 in the land section of the sipes 20 on both sides of the holes 22. Accordingly, cracks starting from the end parts 21 in the land section of the sipes 20 hardly occur.

Furthermore, concentration of stress on the two end parts 21 in the land section on both sides thereof can be avoided by one hole 22, therefore, the number of holes 22 can be reduced as compared with a case where holes are formed with respect to every end part 21 in the land section. Accordingly, the rigidity of the block 18 is not reduced too much.

Furthermore, as the diameter of the hole 22 becomes smaller toward the deeper position in the embodiment, a capacity of the hole is smaller than that of a cylindrical hole with a constant diameter. Accordingly, the rigidity of the blocks 18 is not reduced too much although the holes 22 are formed.

Incidentally, the diameter of the holes 22 becomes smaller toward the deeper position in the embodiment, therefore, the diameter of the holes 22 becomes smaller as wear of the block 18 proceeds. Accordingly, the effect of dispersing stress by the holes 22 seems to be reduced as wear of the block 18 proceeds. However, a deformation amount of the block 18 is reduced as the block 18 is worn down and reduced in height, therefore, stress applied to the end parts 21 in the land section of the sipes 20 is reduced. Consequently, even when the block 18 is worn down and the diameter of the holes 22 is reduced, stress applied to the end parts 21 in the land section of sipes 20 can be sufficiently dispersed by the holes 22.

When the depth of the holes 22 is 50% or more to 100% or less of the depth of the sipe 20, the stress applied to the end parts 21 in the land section of the sipe 20 can be sufficiently dispersed. Also, when the diameter of the holes 22 at the opening end 23 is 15% or more of the length of the line segment L, stress applied to the end parts 21 in the land section of the sipe 20 can be sufficiently dispersed, and when the diameter is 30% or less, the rigidity of the block 18 is not reduced too much. Moreover, when the diameter of the hole 22 continuously becomes smaller as coming toward the bottom part 24 of the hole 22, a portion on which stress is concentrated is not formed in an inner wall 25 (see FIG. 4) of the hole 22, therefore, cracks starting from the holes 22 hardly occur.

As the hole 22 is not too far from the end part 21 in the land section when a distance from the end part 21 in the land section to the center of the hole 22 is 40% or less of the depth of the sipe 20, stress applied to the end part 21 in the land section of the sipe 20 is dispersed further sufficiently by the hole 22. When the distance from the end part 21 in the land section to the center of the hole 22 is 20% or more of the depth of the sipe 20, concentration of stress between the end part 21 in the land section and the hole 22 can be alleviated.

Here, the reason why the preferred upper limit of the distance from the end part 21 in the land section to the center of the hole 11 relates to the depth of the sipe 20 is that the effect of dispersing the stress due to the hole 22 is generated even when the hole 22 is far from the end part 21 in the land section as rubber moves in a wider range around the sipe 20 as the depth of the sipe 20 becomes deeper. Moreover, the reason why the preferred lower limit of the distance from the end part 21 in the land section to the center of the hole 11 relates to the depth of the sipe 20 is that the stress tends to be concentrated on a portion between the end part 21 in the land section and the hole 22 as the sipe 20 becomes deeper and that, it is preferable to keep the hole 22 away from the end part 21 in the land section for alleviating the concentration of stress.

Furthermore, in order to form the bottom part of the hole in a pointed shape, it is necessary to form a pointed part for forming such hole in a metal mold for molding the tire. However, such pointed part in the metal mold is low in strength and is easily distorted. On the other hand, when the bottom part 24 of the hole 22 is the flat surface as in the embodiment, the pointed part is not necessary in the metal mold for forming the pneumatic tire, therefore, any trouble hardly occurs in the metal mold.

Next, modification examples of the above embodiment will be explained. Note that various modifications may occur in addition to the following modification examples, and the scope of the invention is not limited to the scope of the above embodiment and the following modification examples.

Figure 5:
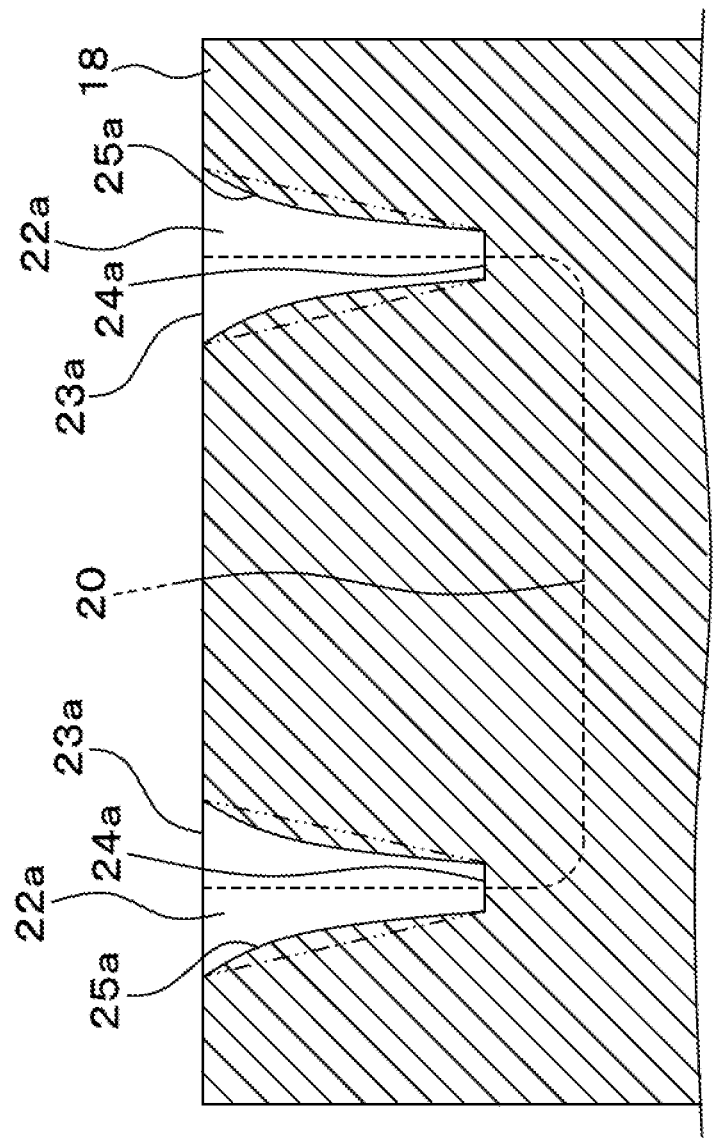
FIG. 5 is a cross-sectional view (cross-sectional view in B-B position of FIG. 2) of holes in the depth direction according to a modification example.
Figure 6:
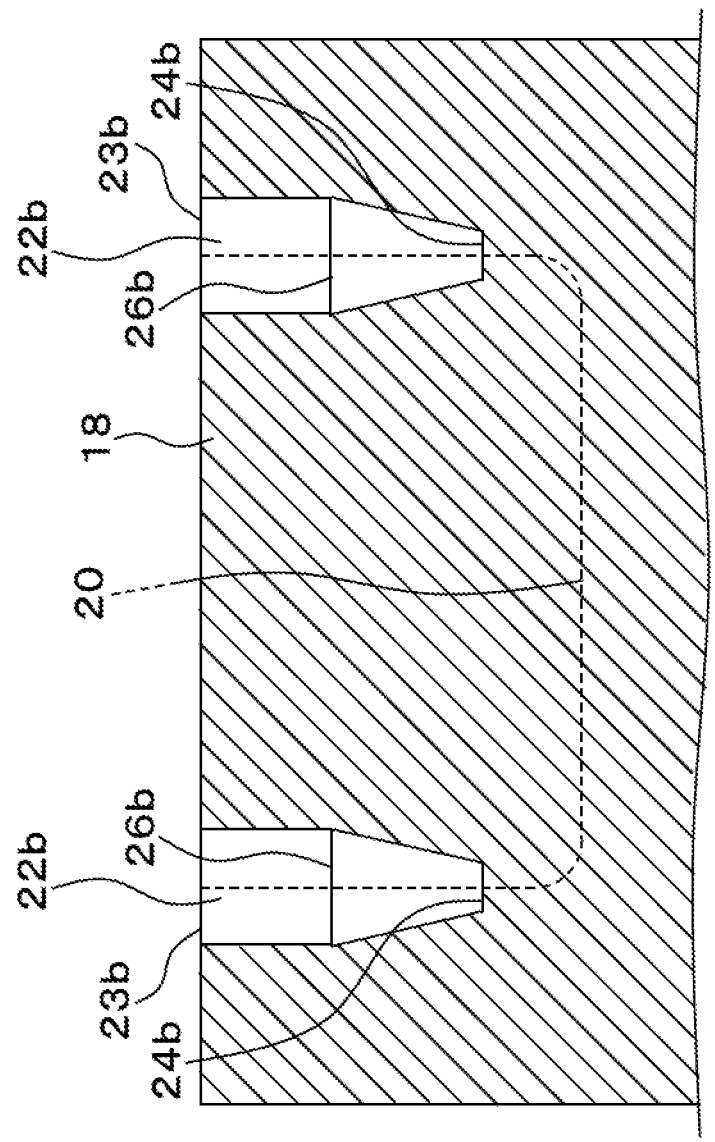
FIG. 6 is a cross-sectional view (cross-sectional view in B-B position of FIG. 2) of holes in the depth direction according to a modification example.

First, the cross-sectional shape in the depth direction of the hole is not limited to the shape shown in the above embodiment, and for example, shapes shown in FIG. 5 and FIG. 6 may be adopted.

In a hole 22a shown in FIG. 5, an inner wall 25a extending from an opening end 23a with respect to the ground contact surface toward a bottom part 24a is a curved surface warped in a direction of reducing a capacity of the hole 22a (in other words, a curved surface which is convex to an inner side of the hole 22a). Therefore, the inner wall 25a extending from the opening end 23a toward the bottom part 24a draws a curved line warped to the inner side of the hole 22a in a cross section in a depth direction of the hole 22a (in other words, a curved line which is convex to the inner side of the hole 22a). As the capacity of the note 22a is reduced by the warp of the inner wall 25a of the hole 22a as described above, the rigidity of the block 18 is not reduced too much. A two-dot chain line in FIG. 5 indicates the inner wall 25 in FIG. 4.

In the holes 22b shown in FIG. 6, a portion from an opening end 23b with respect to the ground contact surface to a predetermined depth position 26b is a cylindrical shape, and the diameter of the hole 22b is continuously reduced at a portion deeper than the predetermined depth position 26b as coming toward a bottom part 24b. Also when the holes 22b are formed, cracks starting from the end parts 21 in the land section of the sipes 20 hardly occur and the rigidity in the blocks 18 is not reduced too much.

Figure 7:
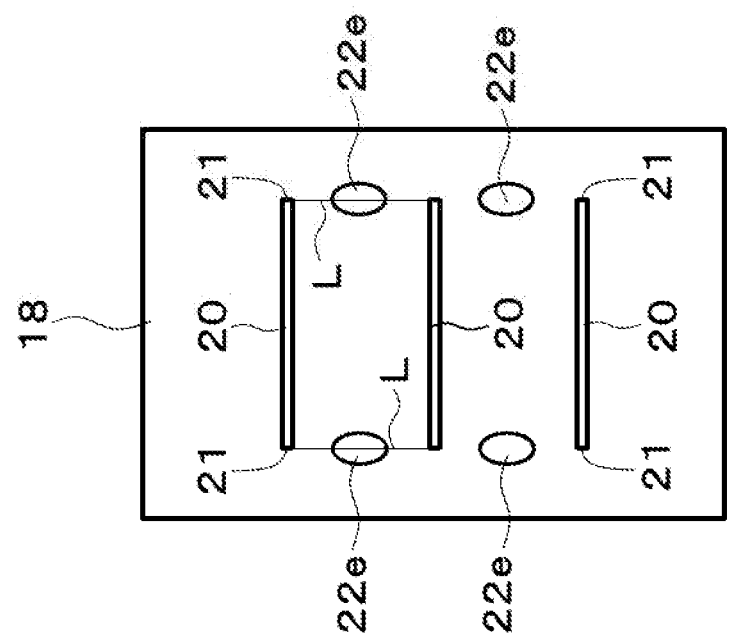
FIG. 7 is a plan view showing a block according to a modification example.
Figure 8:
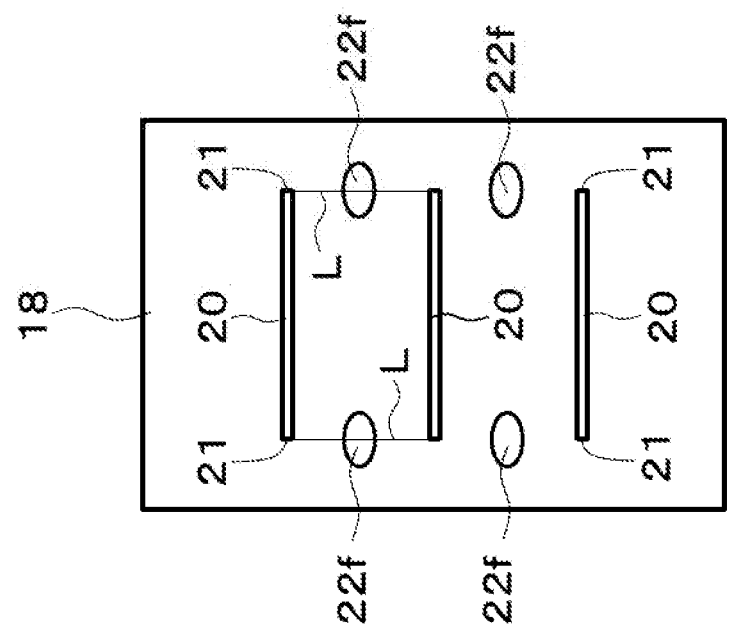
FIG. 8 is a plan view showing a block according to a modification example.

The shape of the hole on the line segment L in plan view may be an elliptical shape. As specific examples, holes 22e shown in FIG. 7 have the elliptical shape elongated in the tire circumferential direction in plan view and holes 22f shown in FIG. 8 have an elliptical shape elongated in the tire width direction in plan view.

In the above holes 22e, 22f having the elliptical shape, the diameter means an average value of a long diameter and a short diameter of an ellipse. Therefore, the average value of the long diameter and the short diameter is reduced as the holes 22, 22f having the elliptical shape come to deeper positions. When one hole 22e/22f is formed on one line segment L, the average value of the long diameter and the short diameter of the elliptical holes 22e/22f at the opening end with respect to the ground contact surface is, for example, 15% or more to 30% or less of the length of the line segment L. When two or more holes 22e/22f are formed on one line segment L, the sum total of average values of the long diameter and the short diameter of all holes 22e/22f is, for example, 15% or more to 30% or less of the length of the line segment L.

Figure 9:
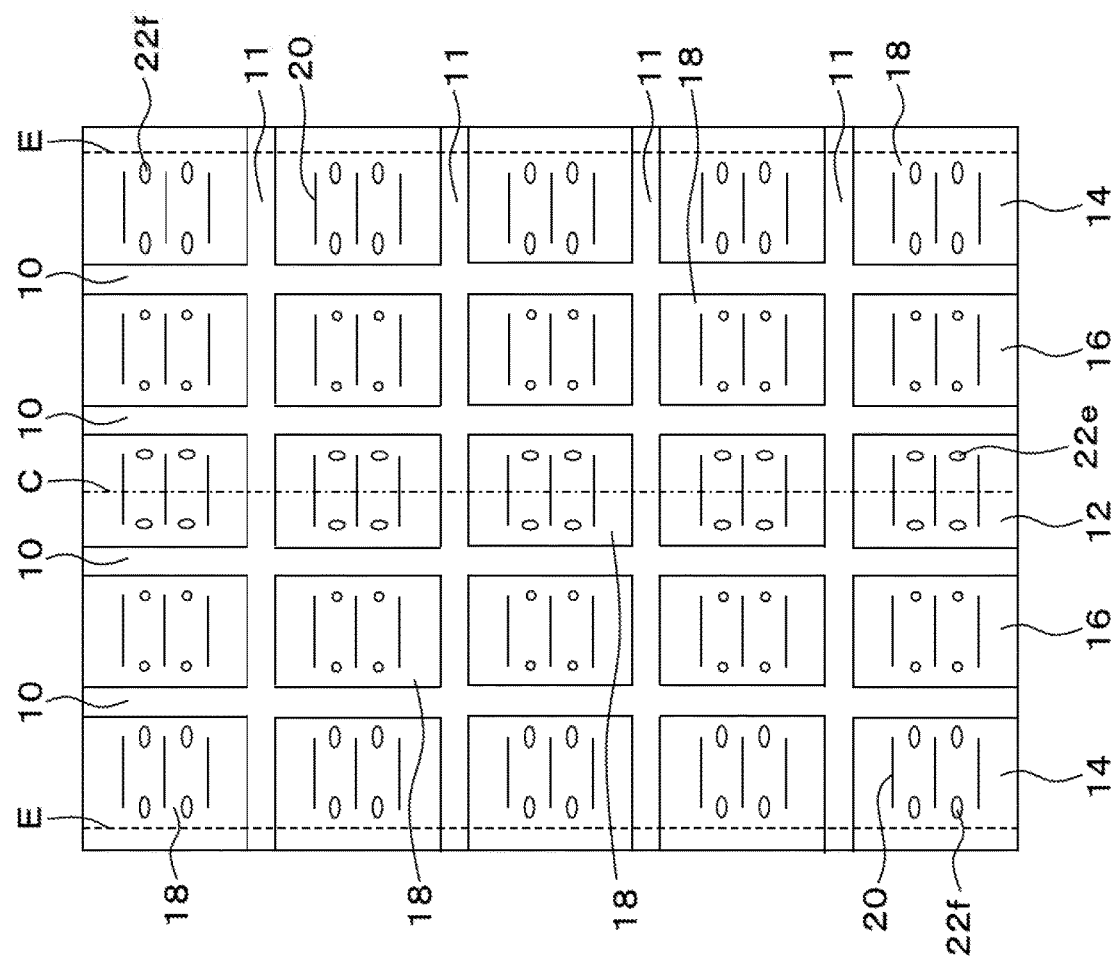
FIG. 9 shows a tread pattern according to a modification example.

When such holes 22e, 22f having the elliptical shape are formed, it is possible that the holes 22e having the elliptical shape elongated in the tire circumferential direction are formed in the center region 12 of the tread and the holes 22f having the elliptical shape elongated in the tire width direction are formed in the shoulder regions 14 as shown in FIG. 9.

Generally, large stress in the tire circumferential direction is applied to the center region 12. However, the holes 22e having the elliptical shape elongated in the tire circumferential direction can be largely deformed in the tire circumferential direction, therefore, large stress in the tire circumferential direction applied to the center region 12 can foe absorbed and occurrence of cracks starting from the end parts 21 in the land sections of the sipes 20 can be prevented.

Moreover, large stress in the tire width direction is generally applied to the shoulder regions 14. However, the holes 22f having the elliptical shape elongated in the tire width direction can be largely deformed in the tire width direction, therefore, large stress in the tire width direction applied to the shoulder regions 14 can be absorbed and occurrence of cracks starting from the end parts 21 in the land sections of the sipes 20 can be prevented.

In the tread patterns other than FIG. 1 and FIG. 9, the center region indicates land sections through which the center line C in the tire width direction passes. In a case where the center line C in the tire width direction does not pass through land sections and corresponds to the main groove, the center region indicates land sections on both sides of the center line C in the tire width direction. The shoulder regions are land sections having tire ground contact ends E on outer sides in the tire width direction.

Furthermore, the shape of the holes in plan view and the cross-sectional shape of the holes in the depth direction are preferably the same on both sides of the extending direction of the sipe 20. However, at least one of the shape of the holes in plan view and the cross-sectional shape of the holes in the depth direction may differ on both sides in the extending direction of the sipe 20.

DESCRIPTION OF REFERENCE NUMERALS AND SIGNS

C . . . center line in tire width direction, E . . . tire ground contact end, L . . . line segment, 10 . . . main groove, 11 . . . lateral groove, 12 . . . center region, 14 . . . shoulder region, 16 . . . mediate region, 18 . . . block, 20 . . . sipe, 21 . . . end part in land section, 22, 22a, 22b, 22e, 22f . . . hole, 23, 23a, 23b . . . opening end, 24, 24a, 24b . . . bottom part, 25, 25a . . . inner wall, 26b . . . predetermined depth position

The invention claimed is:

1. A pneumatic tire in which a plurality of sipes are formed in land sections of a tread and at least one of end parts in an extending direction of each sipe is an end part in the land section that is blocked in the land section, wherein holes separated from the sipes are formed on line segments connecting the end parts in the land section of adjacent two sipes to each other, each hole has a circular shape or an elliptical shape in plan view, a diameter of which becomes smaller as coming toward a deeper position, an inner wall extending from an opening end toward a bottom part of the hole is a curved surface warped in a direction of reducing a capacity of the hole, and wherein both end parts in an extending direction of each sipe is an end part in the land section that is blocked in the land section, and a first hole is formed on a a line segment connecting one end parts in the land section of adjacent two sipes to each other, and a second hole is formed on a line segment connecting the other end parts in the land section of the adjacent two sipes to each other.

2. The pneumatic tire according to claim 1,
wherein one hole is formed on the line segment, and
the hole is formed in a central position of the line segment.

3. The pneumatic tire according to claim 1,
wherein a depth of the hole is 50% or more to 100% or less of a depth of the sipe.

4. The pneumatic tire according to claim 1,
wherein the holes formed in a center region of the tread have an elliptical shape elongated in a tire circumferential direction in plan view.

5. The pneumatic tire according to claim 1,
wherein the holes formed in shoulder regions of the tread have an elliptical shape elongated in a tire width direction in plan view.

6. The pneumatic tire according to claim 4,
wherein the holes formed in shoulder regions of the tread have an elliptical shape elongated in a tire width direction in plan view.

7. The pneumatic tire according to claim 1,
wherein an inner wall extending from the opening end toward the bottom part of the hole is a curved surface warped in a direction of reducing a capacity of the hole.

8. The pneumatic tire according to claim 1,
wherein a depth of the hole is 50% or more to 100% or less of a depth of the sipe, and
the depth and the diameter of each of the holes are the same.

9. The pneumatic tire according to claim 1,
wherein a depth of the hole is 50% or more to 100% or less of a depth of the sipe, and
at least one of the depth or the diameter of each of the holes is different.

10. The pneumatic tire according to claim 1,
wherein a distance between the at least one end part in the land section and a center of the hole on the line segment extended from the end part in the land section is 20% or more to 40% or less of a depth of the sipe.

* * * * *